United States Patent [19]

Schefczik

[11] 4,009,165

[45] Feb. 22, 1977

[54] NAPHTHOLACTAM DYES

[75] Inventor: Ernst Schefczik, Ludwigshafen, Germany

[73] Assignee: BASF Aktiengesellschaft, Ludwigshafen (Rhine), Germany

[22] Filed: May 5, 1975

[21] Appl. No.: 574,401

[30] Foreign Application Priority Data

June 11, 1974 Germany .......................... 2428198

[52] U.S. Cl. ................. 260/256.4 C; 260/247.1 L; 260/256.5 R
[51] Int. Cl.² ....................................... C07D 403/04
[58] Field of Search ............................ 260/256.4 C

[56] References Cited

UNITED STATES PATENTS 3,940,398 2/1976 Wade et al. ................ 260/256.4 C

Primary Examiner—Donald G. Daus
Assistant Examiner—James H. Turnipseed
Attorney, Agent, or Firm—Johnston, Keil, Thompson & Shurtleff

[57] ABSTRACT

Condensation products of derivatives of naphtholactam and barbituric acid useful as dyes for synthetic fibers, particularly synthetic linear polyesters, and for coloring resins. The dyes give brilliant yellow to violet shades having outstanding fastness properties.

5 Claims, No Drawings

NAPHTHOLACTAM DYES

The invention relates to dyes of the formula (I):

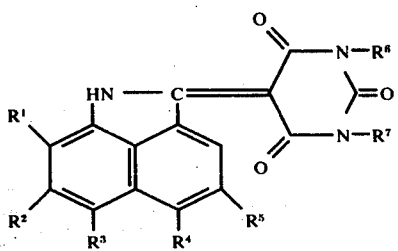 (I)

in which
R$^1$ is hydrogen, chloro, bromo, alkyl, alkoxy, nitro or arylmercapto;
R$^2$ is hydrogen or chloro;
R$^3$ is hydrogen, chloro, bromo, alkyl, alkoxy, nitro, carboxylic acylamino, alkylsulfonylamino, arylsulfonylamino, alkylmercapto, arylmercapto, arylsulfonyl, alkylsulfonyl, unsubstituted or substituted sulfamoyl, alkanoyl or aroyl;
R$^4$ is hydrogen, chloro, alkoxy or arylmercapto; or
R$^3$ and R$^4$ together form a radical of the formula:

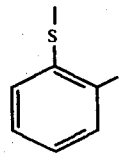 or 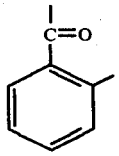

R$^5$ is hydrogen, chloro or alkoxy; and
R$^6$ and R$^7$ independently of one another are alkyl; alkyl bearing hydroxy, cyano, alkoxy or carbalkoxy as a substituent; phenyl; or phenyl bearing chloro, methyl or methoxy as a substituent, at least one of R$^1$ to R$^5$ being different from hydrogen.

Interpretations of R$^1$ to R$^5$:

Examples of alkyl, alkoxy and arylmercapto groups for R$^1$ are methyl, ethyl, methoxy, ethoxy, phenylmercapto or phenylmercapto bearing chloro, methyl, methoxy, phenyl, phenoxy or methoxycarbonyl as a substituent.

Examples for R$^3$ are the same radicals as for R$^1$ and also naphthylmercapto, acetylaminophenylmercapto, acetylamino, propionylamino, benzoylamino, benzoylamino bearing chloro, methyl or methoxy as a substituent, methylsulfonylamino, ethylsulfonylamino, phenylsulfonylamino, tolylsulfonylamino, methylmercapto, β-hydroxyethylmercapto, methylsulfonyl, ethylsulfonyl, phenylsulfonyl, tolylsulfonyl, chlorophenylsulfonyl, acetyl, propionyl, butyryl, benzoyl, benzoyl bearing methyl, methoxy, chloro or bromo as a substituent, sulfamoyl, N-methylsulfamoyl, N-ethylsulfamoyl, N-butylsulfamoyl, N-phenylsulfamoyl, N-chlorophenylsulfamoyl, N-methylphenylsulfamoyl, N-methoxyphenylsulfamoyl, N-trifluoromethylphenylsulfamoyl, N-methyl-N-phenylsulfamoyl, N,N-dimethylsulfamoyl, N,N-diethylsulfamoyl, N,N-dipropylsulfamoyl, N,N-dibutylsulfamoyl, pyrrolidinosulfonyl, piperidinosulfonyl or morpholinosulfonyl. Radicals of the formulae: NHCONH$_2$, NHCONHCH$_3$ and NHCONHC$_6$H$_5$ are also suitable, Examples of radicals R$^4$ are hydrogen, chloro and the alkoxy and arylmercapto radicals specified for R$^1$.

Examples of alkoxy radicals R$^5$ are methoxy and ethoxy.

Particular examples of R$^6$ and R$^7$ are alkyl of one to four carbon atoms, alkoxyalkyl of three to eight carbon atoms, hydroxyalkyl of two or three carbon atoms, cyanoethyl, alkoxycarbonylalkyl of one to four carbon atoms in the alkoxy and also phenyl.

Specific examples are: propyl, butyl, methoxyethyl, ethoxyethyl, butoxyethyl, methoxypropyl, ethoxypropyl, pentoxypropyl, β-hydroxyethyl, β-hydroxypropyl, methoxycarbonylethyl, ethoxycarbonylethyl and butoxycarbonylethyl and preferably methyl, ethyl and phenyl.

Dyes of the formula (I) may be prepared by reacting a naphtholactam of the formula (II):

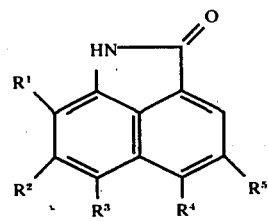 (II)

or a derivative of the same in which the grouping

HN—C=O is replaced by HN—C=S, N=C=S—alkyl, N=C—O—alkyl, HN—CCl$_2$ or N=C—Cl with an N,N'-disubstituted barbituric acid derivative of the formula (III)

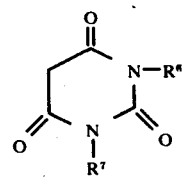 (III)

Compounds of the formula (II) are known from the literature or may be prepared by methods analogous to those described in the literature.

The reaction of the naphtholactams with the compounds of formula (III) proceeds in the presence of a condensing agent; when the said naphtholactam derivatives are used the presence of a condensing agent may be dispensed with.

Phosphorous halides such as phosphorus pentachloride, phosphorus trichloride or phosphorus oxytribromide and particularly phosphorus oxytrichloride are suitable as condensing agents.

The reaction may be carried out in an inert solvent such as toluene, chlorobenzene, dichlorobenzene, nitrobenzene or dioxane or also in an excess of the condensing agent.

When the reation is carried out with a naphtholactam derivative and without a condensing agent the abovementioned solvents are again suitable; examples of additional solvents are pyridine, glacial acetic acid, dimethylformamide and N-methylpyrrolidone.

The reactions are known in principle and details may be taken from the Examples in which parts and percentages are by weight.

The invention relates particularly to dyes of the formula:

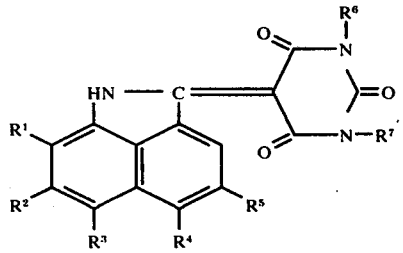

in which
$R^1$ is hydrogen, chloro, bromo, $C_1$ to $C_4$ alkyl, methoxy, ethoxy, nitro, phenylmercapto or phenylmercapto bearing chloro, methyl or methoxy as a substituent;

$R^2$ is hydrogen or chloro;

$R^3$ is chloro, bromo, $C_1$ to $C_4$ alkyl, methoxy, ethoxy, nitro, acetylamino, propionylamino, benzoylamino, methylsulfonylamino, ethylsulfonylamino, phenylsulfonylamino, tolylsulfonylamino, methylmercapto, ethylmercapto, phenylmercapto, phenylmercapto bearing chloro, methyl or methoxy as a substituent, naphthylmercapto, phenylsulfonyl, phenylsulfonyl bearing chloro or methyl as a substituent, methylsulfonyl, ethylsulfonyl, N-mono-$C_1$-to-$C_8$-alkyl-substituted sulfamoyl, N,N-di-$C_1$-to-$C_8$-alkyl-substituted sulfamoyl, N-phenylsulfamoyl, N-chlorophenylsulfamoyl, N-methylphenylsulfamoyl, N-methoxyphenylsulfamoyl, N-trifluoromethylphenylsulfamoyl, sulfopyrrolidide, sulfopiperidide, sulfomorpholide, $C_2$ to $C_4$ alkanoyl, benzoyl, or benzoyl bearing chloro, bromo, methyl, ethyl, methoxy or ethoxy as a substituent;

$R^4$ is hydrogen, chloro, methoxy, ethoxy, phenylmercapto, or phenylmercapto bearing chloro, methyl or methoxy as a substituent;

$R^3$ and $R^4$ together may be

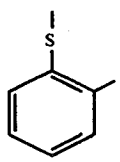 or 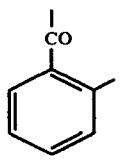

$R^5$ is hydrogen, chloro, methoxy or ethoxy; and $R^6$ and $R^7$ are independently $C_1$ to $C_8$ alkyl, $C_2$ to $C_8$ alkyl bearing hydroxy, cyano, $C_1$ to $C_4$ alkoxy or $C_1$ to $C_4$ alkoxycarbonyl as a substituent, phenyl, or phenyl bearing chloro, methyl or methoxy as a substituent. Particular industrial importance attaches to dyes of formula (Ia):

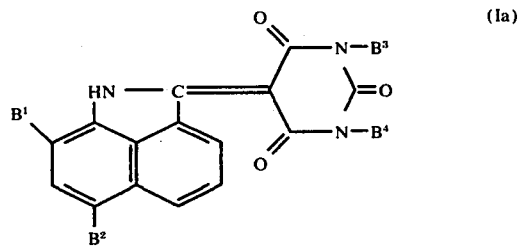

in which
$B^1$ is hydrogen, chloro, bromo or arylmercapto;
$B^2$ is hydrogen, chloro, bromo, arylmercapto, arylsulfonyl, or aroyl; and
$B^3$ and $B^4$ are independently methyl, ethyl or phenyl, methyl being particularly preferred.

The following are preferred arylmercapto, arylsulfonyl and aroyl radicals: phenylmercapto, phenylmercapto bearing chloro, methyl or methoxy as a substituent, phenylsulfonyl or benzoyl, or benzoyl or phenylsulfonyl bearing chloro or methyl as a substituent.

Dyes of formula (I) are yellow to violet and have high brilliance and color strength. They are suitable for dyeing synthetic fibers, particularly polyester fibers, and dyeings having very good fastness properties and particularly excellent fastness to light are obtained. Thermal resistance properties may be influenced by the choice of substituents. Dyes which sublime easily are very suitable for transfer printing.

The new dyes are moreover eminently suitable for the mass coloration of plastics; fluorescent colorations having high fastness to light are obtained as a rule.

The following Examples illustrate the invention.

EXAMPLE 1

200 Parts of phosphorus oxychloride is dripped into a mixture of 309 parts of 4-phenylsulfonylnaphtholactam, 165 parts of N,N'-dimethylbarbituric acid and 1200 parts by volume of toluene at 90° C. The whole is stirred for 6 hours at 100° C and 1200 parts by volume of methanol is added during cooling so that the dye is deposited in the form of brown crystals. After cooling, the dye is filtered off, washed with methanol and dried. 357 parts of the dye of the constitution

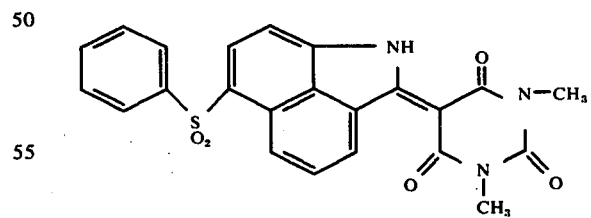

is obtained which dyes polyester from an aqueous liquor brilliant yellow hues of high tinctorial strength and very good lightfastness and thermal stability.

EXAMPLE 2

The procedure of Example 1 is followed, but the N,N'-dimethylbarbituric acid is replaced by an equivalent amount of N-methyl-N-phenylbarbituric acid. 427 parts of the dye of the constitution

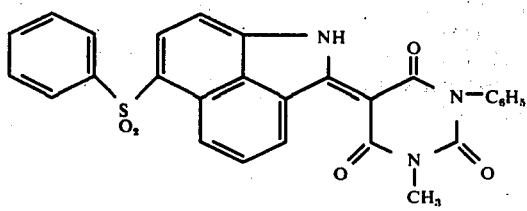

is obtained which dyes polyester fast golden yellow hues.

EXAMPLE 3

273 Parts of 4-benzoylnaphtholactam-(1,8) and 190 parts of N,N'-dimethylbarbituric acid are introduced into 1000 parts by volume of toluene and stirred at 95° C. 300 parts of phosphorus oxychloride is dripped in within 30 minutes so that the starting materials pass into solution. The whole is stirred for 4 hours at 100° C and during cooling 2000 parts by volume of methanol is allowed to flow in. After suction filtration, washing with methanol and drying there is obtained 360 parts of the dye having the constitution:

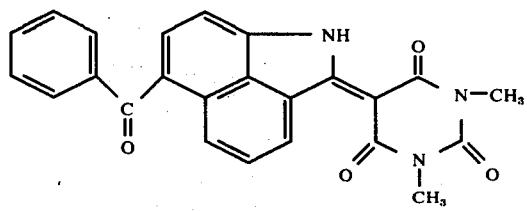

in the form of yellowish brown crystals. The dye dyes polyester brilliant greenish yellow shades from an aqueous liquor; the dyeings have very good fastness to dry-heat pleating and setting and to light. In thermoplastics such as polystyrene fluorescent yellow hues having outstanding stability at high temperatures and outstanding fastness to light are obtained.

EXAMPLE 4

250 Parts of phosphorous oxychloride is added at 100° C within one hour to a mixture of 277 parts of 4-phenylmercaptonaphtholactam-(1,8), 190 parts of N,N'-dimethylbarbituric acid and 900 parts by volume of chlorobenzene. The whole is stirred for another 4 hours at 100° C and during cooling there is added a solution of 150 parts of triethylamine in 1500 parts by volume of ethanol. After suction filtration, washing with ethanol and drying there is obtained 349 parts of the dye of the constitution:

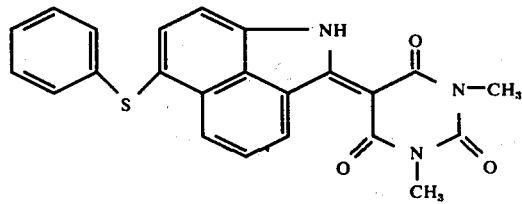

in the form of a dark red crystalline powder. Brilliant scarlet dyeings and prints of a high level of fastness properties are obtained on polyesters. Thermoplastics such as polystyrene for example are colored fluorescent scarlet shades having excellent stability at high temperatures and excellent fastness to light.

EXAMPLE 5

293 Parts of 4-phenylmercaptothionaphtholactam and 160 parts of N,N'-dimethylbarbituric acid are boiled in 400 parts by volume of N-methylpyrrolidone for eight hours. 200 Parts by volume of ethanol is added during cooling. The product is suction filtered, washed and dried. 302 parts of dye is obtained which is identical with that specified in Example 4.

EXAMPLE 6

307 Parts of 4-phenylmercapto-thionaphtholactim-S-methyl ether and 160 parts of N,N'-dimethylbarbituric acid are boiled in 600 parts by volume of acetic acid for 1 hour. The dye precipitates in the form of red crystals. Upon working up, 328 parts of dye is obtained which is identical with that specified in Example 4.

EXAMPLE 7

41.3 Parts of 2,4-bis-(4-methylphenylmercapto)-naphtholactam-(1,8) and 20 parts of N,N'-diethylbarbituric acid are introduced into 150 parts by volume of dichlorobenzene and stirred at 95° C. 30 parts of phosphorus oxychloride is dripped in so that the components pass into solution. The whole is stirred for 6 hours at 95° C, diluted with 300 parts by volume of methanol and allowed to cool while stirring. The red crystals are suction filtered, washed with methanol and dried. 49.2 parts of the dye of the constitution:

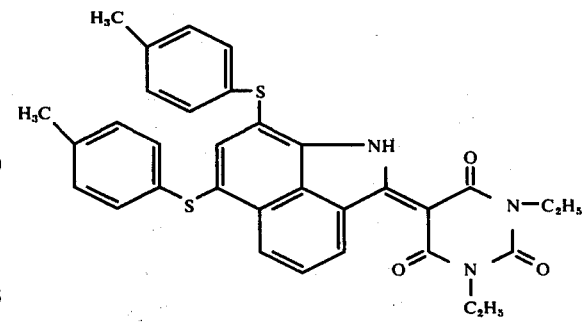

is obtained which gives in polystyrene bluish red hues of outstanding stability at high temperatures and outstanding fastness to light.

EXAMPLE 8

268 Parts of the compound of the formula

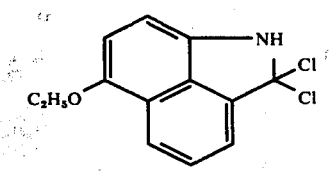

(prepared by the method of German Laid-Open Specification No. 1,445,624, Example 2) is heated for 30 minutes at 100° to 120° C in 1,000 parts of xylene. 220 parts of N-methyl-N'-(3-methoxypropyl)-barbituric acid is added and heating is continued at 100° C for 120 minutes. During cooling, 500 parts of methanol is added and the dye isolated in the usual manner. 311 Parts of the dye of the constitution

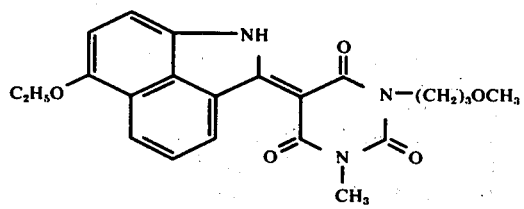

is obtained in the form of orange crystals, which dye polyester reddish yellow hues having very good light-fastness.

The following dyes of the general formula (I) are prepared according to the methods specified in Examples 1 to 8.

| Ex. | R¹ | R² | R³ | R⁴ | R⁵ | R⁶ | R⁷ | Hue |
|---|---|---|---|---|---|---|---|---|
| 9 | —C₂H₅ | H | H | H | H | —CH₃ | —CH₃ | greenish yellow |
| 10 | H | H | —CH₃ | H | H | —CH₃ | —CH₃ | " |
| 11 | H | H | Cl | H | H | —CH₃ | —CH₃ | reddish yellow |
| 12 | H | H | Cl | H | H | —CH₃ | —C₆H₅ | " |
| 13 | H | H | Cl | H | H | —C₂H₅ | —C₆H₅ | " |
| 14 | Cl | H | Cl | H | H | —CH₃ | —CH₃ | " |
| 15 | Cl | H | Cl | H | H | —CH₃ | —C₂H₅ | " |
| 16 | Cl | H | Cl | H | H | —CH₃ | —(CH₂)₃OCH₃ | " |
| 17 | H | H | H | Cl | H | —CH₃ | —CH₃ | " |
| 18 | H | H | Cl | Cl | H | —CH₃ | —CH₃ | orange yellow |
| 19 | H | H | Cl | Cl | H | —C₂H₅ | —C₂H₅ | " |
| 20 | H | Cl | Cl | Cl | Cl | —CH₃ | —CH₃ | yellowish orange |
| 21 | H | Cl | Cl | Cl | Cl | —C₄H₉ | —C₄H₉ | " |
| 22 | H | Cl | Cl | Cl | Cl | —CH₃ | —(CH₂)₃OC₂H₅ | " |
| 23 | H | Cl | Cl | Cl | Cl | —C₂H₅ | —C₂H₅ | " |
| 24 | H | H | Br | H | H | —CH₃ | —CH₃ | reddish yellow |
| 25 | H | H | Br | H | H | —CH₃ | —C₄H₉ | " |
| 26 | H | H | Br | H | H | —CH₃ | —(CH₂)₃OCH₃ | " |
| 27 | H | H | Br | H | H | —C₆H₅ | —C₆H₅ | " |
| 28 | Br | H | Cl | H | H | —CH₃ | —CH₃ | " |
| 29 | Cl | H | Br | H | H | —CH₃ | —CH₃ | " |
| 30 | Br | H | Br | H | H | —CH₃ | —CH₃ | yellowish orange |
| 31 | Br | H | Br | H | H | —CH₃ | —(CH₂)₃OCH₃ | " |
| 32 | Br | H | Br | H | H | —CH₃ | —(CH₂)₃OC₂H₅ | " |
| 33 | Br | H | Br | H | H | —C₄H₉ | —C₄H₉ | " |
| 34 | Br | H | Br | H | H | —C₆H₅ | —C₆H₅ | " |
| 35 | H | H | NO₂ | H | H | —CH₃ | —CH₃ | golden yellow |
| 36 | H | H | NO₂ | H | H | —C₂H₅ | —C₂H₅ | golden yellow |
| 37 | NO₂ | H | Br | H | H | —CH₃ | —CH₃ | reddish yellow |
| 38 | Br | H | NO₂ | H | H | —CH₃ | —CH₃ | golden yellow |
| 39 | H | H | OCH₃ | H | H | —CH₃ | —CH₃ | yellow |
| 40 | H | H | OCH₃ | H | H | —CH₃ | —C₂H₅ | " |
| 41 | H | H | OCH₃ | H | H | —C₆H₅ | —C₆H₅ | " |
| 42 | H | H | OC₂H₅ | H | H | —CH₃ | —CH₃ | " |
| 43 | H | H | NHCONH₂ | H | H | —CH₃ | —CH₃ | " |
| 44 | H | H | NHCONH₂ | H | H | —C₆H₅ | —C₆H₅ | " |
| 45 | H | H | NHCONHCH₃ | H | H | —C₆H₅ | —C₆H₅ | " |
| 46 | H | H | NHCONHC₆H₅ | H | H | —C₆H₅ | —C₆H₅ | " |
| 47 | H | H | NHCOC₆H₅ | H | H | —CH₃ | —CH₃ | " |
| 48 | H | H | NHCOC₆H₅ | H | H | —C₂H₅ | —C₂H₅ | " |
| 49 | H | H | NHSO₂C₆H₅ | H | H | —CH₃ | —CH₃ | " |
| 50 | H | H | —CH₃ | —CH₃ | H | —CH₃ | —CH₃ | " |
| 51 | H | H | H | —OCH₃ | H | —CH₃ | —CH₃ | " |
| 52 | H | H | H | H | —OCH₃ | —CH₃ | —CH₃ | " |
| 53 | H | H | H | H | —OCH₂C₆H₅ | —CH₃ | —CH₃ | " |
| 53 | H | H | SCH₃ | H | H | —CH₃ | —CH₃ | orange |
| 55 | H | H | SC₆H₅ | H | H | —CH₃ | —C₂H₅ | yellowish red |
| 56 | H | H | SC₆H₅ | H | H | —CH₃ | —(CH₂)₃OCH₃ | " |
| 57 | H | H | SC₆H₅ | H | H | —C₂H₅ | —C₂H₅ | " |
| 58 | H | H | SC₆H₅ | H | H | —CH₃ | —C₄H₉ | " |
| 59 | H | H | SC₆H₅ | H | H | —C₆H₅ | —C₆H₅ | " |
| 60 | H | H | Cl | SC₆H₅ | H | —CH₃ | —CH₃ | orange yellow |
| 61 | H | H | Cl | SC₆H₅ | H | —CH₃ | —(CH₂)₃OCH₃ | " |
| 62 | H | H | SC₆H₄CH₃(4) | H | H | —CH₃ | —CH₃ | red |
| 63 | H | H | SC₆H₄CH₃(4) | H | H | —C₂H₅ | —C₂H₅ | " |
| 64 | H | H | Cl | SC₆H₄CH₃(4) | H | —CH₃ | —CH₃ | orange |
| 65 | H | H | SC₆H₄OCH₃(4) | H | H | —CH₃ | —CH₃ | red |
| 66 | H | H | SC₆H₄OCH₃(4) | H | H | —CH₃ | —C₄H₉ | red |
| 67 | H | H | SC₆H₄OCH₃(4) | H | H | —CH₃ | —(CH₂)₃OC₂H₅ | " |
| 68 | H | H | Cl | SC₆H₄OCH₃(4) | H | —CH₃ | —CH₃ | yellowish |

-continued

| Ex. | R¹ | R² | R³ | R⁴ | R⁵ | R⁶ | R⁷ | Hue |
|---|---|---|---|---|---|---|---|---|
| 69 | H | H | $SC_6H_4Cl(4)$ | H | H | $-CH_3$ | $-CH_3$ | red orange |
| 70 | H | H | $SC_6H_4Cl(4)$ | H | H | $-CH_3$ | $-C_4H_9$ | '' |
| 71 | H | H | $SC_6H_3Cl_2(2,5)$ | H | H | $-CH_3$ | $-CH_3$ | yellowish orange |
| 72 | H | H | $SC_6H_4C_6H_5(4)$ | H | H | $-CH_3$ | $-CH_3$ | red |
| 73 | H | H | $SC_6H_4OC_6H_5(4)$ | H | H | $-CH_3$ | $-CH_3$ | '' |
| 74 | H | H | $SC_6H_4NHCOCH_3(4)$ | H | H | $-CH_3$ | $-CH_3$ | yellowish red |
| 75 | H | H | $SC_6H_4COOCH_3(4)$ | H | H | $-CH_3$ | $-CH_3$ | red |
| 76 | H | H | Naphthyl-2-S- | H | H | $-CH_3$ | $-C_2H_5$ | '' |
| 77 | H | H | Naphthyl-2-S- | H | H | $-C_2H_5$ | $-C_2H_5$ | '' |
| 78 | $SC_6H_5$ | H | Cl | H | H | $-CH_3$ | $-CH_3$ | orange |
| 79 | $SC_6H_5$ | H | Cl | H | H | $-CH_3$ | $-C_4H_9$ | '' |
| 80 | $SC_6H_5$ | H | $NO_2$ | H | H | $-CH_3$ | $-CH_3$ | '' |
| 81 | $SC_6H_5$ | H | $SC_6H_5$ | H | H | $-CH_3$ | $-CH_3$ | reddish orange |
| 82 | $SC_6H_5$ | H | $SC_6H_5$ | H | H | $-C_4H_9$ | $-C_4H_9$ | '' |
| 83 | $SC_6H_5$ | H | $SC_6H_5$ | H | H | $-CH_3$ | $-(CH_2)_3OC_2H_5$ | '' |
| 84 | $SC_6H_5$ | H | $SC_6H_5$ | H | H | $-C_6H_5$ | $-C_6H_5$ | '' |
| 85 | H | H | $SC_6H_5$ | $SC_6H_5$ | H | $-CH_3$ | $-CH_3$ | yellowish red |
| 86 | H | H | $SC_6H_5$ | $SC_6H_5$ | H | $-CH_3$ | $-C_4H_9$ | '' |
| 87 | $SC_6H_4CH_3(4)$ | H | $SC_6H_4CH_3(4)$ | H | H | $-CH_3$ | $-CH_3$ | red |
| 88 | $SC_6H_4CH_3(4)$ | H | $SC_6H_4CH_3(4)$ | $SC_6H_5$ | H | $-CH_3$ | $-(CH_2)_3OCH_3$ | '' |
| 89 | $SC_6H_4CH_3(4)$ | H | $SC_6H_4CH_3(4)$ | $SC_6H_5$ | H | $-C_4H_9$ | $-C_4H_9$ | '' |
| 90 | $SC_6H_4OCH_3(4)$ | H | $SC_6H_4OCH_3(4)$ | H | H | $-CH_3$ | $-CH_3$ | bluish red |
| 91 | $SC_6H_4OCH_3(4)$ | H | $SC_6H_4OCH_3(4)$ | $SC_6H_5$ | H | $-C_2H_5$ | $-C_2H_5$ | '' |
| 92 | H | H | $SC_6H_4OCH_3(4)$ | $SC_6H_4OCH_3(4)$ | H | $-CH_3$ | $-CH_3$ | yellowish red |
| 93 | $SC_6H_4Cl(4)$ | H | $SC_6H_4Cl(4)$ | H | H | $-CH_3$ | $-CH_3$ | reddish orange |
| 94 | $SC_6H_4Cl(4)$ | H | $SC_6H_4Cl(4)$ | H | H | $-CH_3$ | $-C_4H_9$ | reddish orange |
| 95 | $SC_6H_3Cl_2(2,5)$ | H | $SC_6H_3Cl_2(2,5)$ | H | H | $-CH_3$ | $-CH_3$ | orange |

EXAMPLE 96

200 Parts of N,N'-dimethylbarbituric acid and 275 parts of the compound of the constitution:

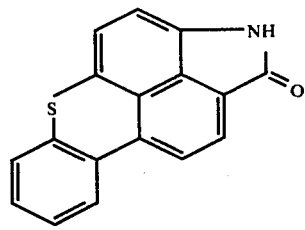

are brought into solution in 1800 parts by volume of anhydrous nitrobenzene by heating. 220 parts of phosphorus oxychloride is dripped in at 100° C and the whole is stirred for another twelve hours at 100° C. After cooling it is diluted with an equal volume of ethanol, suction filtered, washed with ethanol and dried. 321 parts of the dye of the formula:

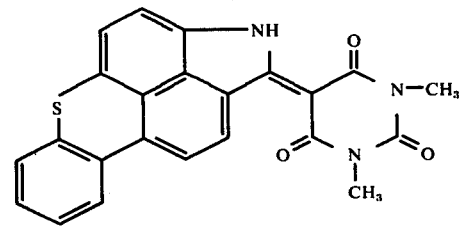

is obtained in the form of a dark crystalline powder. When the dye is incorporated into polystyrene it gives violet hues having good stability to high temperature and good lightfastness properties.

When the N,N-dimethylbarbituric acid is replaced by barbituric acids having other substituents, dyes having very similar hues are obtained.

Other dyes of the constitution (I) which are obtained analogously to Examples 1 to 8, are:

| Ex. | R³ (R¹=R²=R⁴=R⁵=H) | R⁶ | R⁷ | Hue |
|---|---|---|---|---|
| 97 | $-SO_2C_6H_5$ | $-CH_3$ | $-C_4H_9$ | golden yellow |
| 98 | $-SO_2C_6H_5$ | '' | $-(CH_2)_3OC_2H_5$ | '' |
| 99 | $-SO_2C_6H_5$ | $-C_4H_9$ | $-C_4H_9$ | '' |
| 100 | $-SO_2C_6H_4CH_3(4)$ | $-CH_3$ | $-CH_3$ | '' |
| 101 | $-SO_2C_6H_4CH_3(4)$ | '' | $-C_2H_5$ | '' |
| 102 | $-SO_2C_6H_4CH_3(4)$ | $-C_6H_5$ | $-C_6H_5$ | '' |
| 103 | $-SO_2C_6H_4Cl$ | $-CH_3$ | $-CH_3$ | '' |
| 104 | $-SO_2C_6H_4Cl$ | $-C_2H_5$ | $-C_2H_5$ | '' |
| 105 | $-SO_2C_6H_4Cl$ | $-CH_3$ | $-C_4H_9$ | '' |
| 106 | $-SO_2C_6H_4Cl$ | $-C_4H_9$ | $-C_4H_9$ | '' |
| 107 | $-SO_2N)CH_3)_2$ | $-CH_3$ | $-CH_3$ | yellow |
| 108 | $-SO_2N(C_2H_5)_2$ | '' | '' | '' |
| 109 | $-SO_2N(C_4H_9)_2$ | '' | '' | '' |

-continued

| Ex. | R³ (R¹=R²=R⁴=R⁵=H) | R⁶ | R⁷ | Hue |
|---|---|---|---|---|
| 110 | —SO₂N⟨pyrrolidine⟩ | " | " | " |
| 111 | —SO₂N⟨pyrrolidine⟩ | " | —C₂H₅ | " |
| 112 | —SO₂N⟨piperidine⟩ | " | —CH₃ | " |
| 113 | —SO₂N⟨morpholine⟩ | —C₄H₉ | —C₄H₉ | " |
| 114 | —SO₂NHC₆H₅ | —CH₃ | —CH₃ | " |
| 115 | —SO₂NHC₆H₄CH₃(4) | " | " | " |
| 116 | —SO₂NHC₆H₄Cl(2) | " | " | " |
| 117 | —SO₂NHC₆H₄OCH₃(4) | " | " | " |
| 118 | —SO₂NHC₆H₄CF₃(3) | " | " | " |
| 119 | —SO₂N(CH₃)(C₆H₅) | " | " | " |
| 120 | —COCH₃ | " | " | greenish yellow |
| 121 | —COC₃H₇(iso) | —C₆H₅ | —C₆H₅ | " |
| 122 | —COC₆H₅ | —C₂H₅ | —C₂H₅ | " |
| 123 | —COC₆H₅ | —CH₃ | —C₄H₉ | " |
| 124 | —COC₆H₅ | " | —C₆H₅ | " |
| 125 | —COC₆H₅ | —C₆H₅ | " | " |
| 126 | —COC₆H₄CH₃(2) | —CH₃ | —CH₃ | yellow |
| 127 | —COC₆H₄CH₃(4) | " | " | " |
| 128 | —COC₆H₄CH₃(4) | " | —C₂H₅ | " |
| 129 | —COC₆H₄Cl(2) | " | —CH₃ | greenish yellow |
| 130 | —COC₆H₄CL(4) | " | " | " |
| 131 | —COC₆H₄Cl(4) | —C₂H₅ | —C₂H₅ | " |
| 132 | —COC₆H₄Cl(4) | —CH₃ | —(CH₂)₃OCH₃ | " |
| 133 | —COC₆H₃Cl₂(2,4) | " | —CH₃ | " |
| 134 | —COC₆H₃Cl₂(2,4) | " | —C₄H₉ | " |
| 135 | —COC₆H₃Cl₂(3,4) | " | —CH₃ | " |
| 136 | —COC₆H₃Cl₂(2,5) | " | " | " |
| 137 | —COC₆H₃Cl₂(2,5) | " | —(CH₂)₃OC₂H₅ | " |
| 138 | —COC₆H₃Cl₂(2,5) | —C₆H₅ | —C₆H₅ | " |

EXAMPLE 139

208 Parts of N-methyl-N'-butylbarbituric acid and 271 parts of the compound of the constitution:

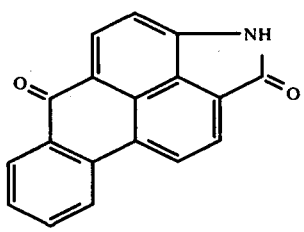

are stirred into 1200 parts by volume of anhydrous trichlorobenzene at 100° C. 300 Parts of phosphorous oxychloride is dripped in within 1 hour and the whole is stirred for another eight hours at 100° C to 110° C. During cooling the whole is diluted with 800 parts by volume of methanol and then suction filtered, washed with methanol and dried. 361 parts of the dye of the constitution:

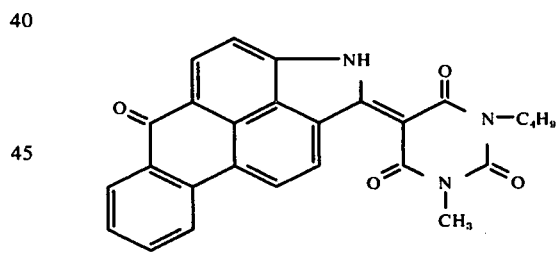

is obtained in the form of reddish brown crystals. Luminous orange colorations having good fastness properties are obtained with the dye in thermoplastics, as for example polystyrene.

I claim:
1. A compound of the formula

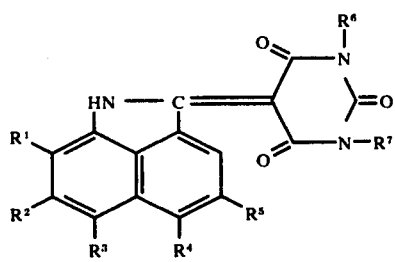

in which
R¹ is hydrogen, chloro, bromo, C₁- to C₄-alkyl, methoxy, ethoxy or nitro,
R² is hydrogen or chloro,
R³ is chloro, bromo, C₁- to C₄-alkyl, methoxy, ethoxy, nitro, acetylamino, propionylamino, benzoylamino, C₂- to C₄-alkanoyl, benzoyl or benzoyl substituted by chloro, bromo, methyl, ethyl, methoxy or ethoxy,
R⁴ is hydrogen, chloro, methoxy or ethoxy,
R³ and R⁴ together are

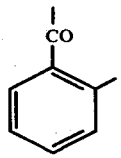

R⁵ is hydrogen, chloro, methoxy or ethoxy and
R⁶ and R⁷ are independently C₁- to C₈-alkyl, C₂- to C₈-alkyl substituted by hydroxy, cyano, C₁- to C₄-alkoxy or C₁- to C₄-alkoxycarbonyl, phenyl, or phenyl substituted by chloro, methyl or methoxy.

2. A compound according to the formula in claim 1, whrein R², R⁴ and R⁵ are hydrogen.

3. A compound according to the formula in claim 1, wherein R¹, R², R⁴ and R⁵ are hydrogen and R³ is benzoyl or benzoyl substituted by chloro, bromo, methl, or methoxy.

4. A compound according to claim 1 of the formula

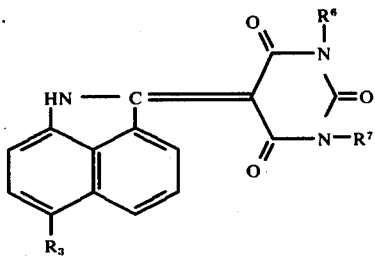

in which
R³ benzoyl, or benzoyl substituted by chloro, bromo, methyl or methoxy, and
R⁶ and R⁷ are methyl or ethyl.

5. The compound according to claim 1 of the formula

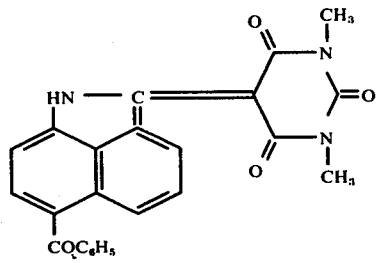

* * * * *

UNITED STATES PATENT AND TRADEMARK OFFICE
CERTIFICATE OF CORRECTION

PATENT NO. : 4,009,165
DATED : February 22, 1977
INVENTOR(S) : Ernst Schefczik

It is certified that error appears in the above–identified patent and that said Letters Patent are hereby corrected as shown below:

In Column 13, Line 3 of Claim 3, delete " methl, " and substitute -- methyl, --

Signed and Sealed this

First Day of November 1977

[SEAL]

Attest:

RUTH C. MASON
Attesting Officer

LUTRELLE F. PARKER
Acting Commissioner of Patents and Trademarks